United States Patent
Chou et al.

(10) Patent No.: US 8,074,513 B2
(45) Date of Patent: Dec. 13, 2011

(54) FLUID MEASURING INSTRUMENT CARRIER STRUCTURE

(76) Inventors: Ping-Hung Chou, Hualien (TW);
Jen-Hsin Chen, Hualien (TW)

( * ) Notice: Subject to any disclaimer, the term of this patent is extended or adjusted under 35 U.S.C. 154(b) by 132 days.

(21) Appl. No.: 12/752,650

(22) Filed: Apr. 1, 2010

(65) Prior Publication Data
US 2011/0239756 A1    Oct. 6, 2011

(51) Int. Cl.
*H04B 1/06*  (2006.01)
(52) U.S. Cl. .................... 73/170.29; 73/170.31
(58) Field of Classification Search ............ None
See application file for complete search history.

(56) References Cited

U.S. PATENT DOCUMENTS

| | | | | |
|---|---|---|---|---|
| 3,376,742 A | * | 4/1968 | Renic | 73/170.29 |
| 3,906,790 A | * | 9/1975 | Brainard et al. | 73/170.07 |
| 4,854,166 A | * | 8/1989 | Futrell, II | 73/170.29 |
| 2005/0199056 A1 | * | 9/2005 | Strong et al. | 73/170.29 |
| 2006/0155492 A1 | * | 7/2006 | Strong et al. | 702/76 |
| 2008/0276702 A1 | * | 11/2008 | Ankori | 73/204.16 |
| 2009/0052282 A1 | * | 2/2009 | Strong et al. | 367/89 |

* cited by examiner

*Primary Examiner* — Andre Allen
(74) *Attorney, Agent, or Firm* — Guice Patents PLLC

(57) ABSTRACT

A fluid measuring instrument carrier structure includes a carrier main body assembled from three axially connected steel pipes. The carrier main body is provided from front to back at predetermined positions with a current meter, a front current-guiding holding-down plate, and a rear current-guiding holding-down plate. The front current-guiding holding-down plate has a gravity-center adjuster connected thereto. By employing the principles of fluid mechanics, the carrier main body with the front and rear current-guiding holding-down plates and the gravity-center adjuster is able to submerge in water and slightly horizontally sway leftward and rightward in water currents to maintain at a stable and balanced state, allowing a user to easily and quickly measure river water depth and current velocity.

10 Claims, 4 Drawing Sheets

FLUID MEASURING INSTRUMENT CARRIER STRUCTURE

FIELD OF THE INVENTION

The present invention relates to a fluid measuring instrument carrier structure, which is designed by employing the principles of fluid mechanics, and allows a user to easily measure river water depth and current velocity.

BACKGROUND OF THE INVENTION

In river planning, either based on a 100-year or a 200-year flood frequency, river flow is always a necessary basis for the planning. When it is desired to directly obtain an actually measured flow, a lead fish must be utilized to measure the water depth during typhoon and flood. The water depth is then used to calculate a cross section area (A), and a current meter is used to measure current velocity (V). Finally, the flow (Q) is obtained using the formula Q=A×V.

The currently available current meter for measuring water depth and current velocity has a lead fish added thereto, so as to utilize the gravity to achieve the purpose of measuring water depth and current velocity. However, during typhoon and flood, since both the water depth and current velocity are increased, a heavier lead fish must be used. The heavy lead fish and the drag of water currents together form an amazing force, which not only consumes the measurer's body energy and threatens the measurer's safety in working, but also has great influence on the accuracy of measuring.

As having been affected by climate change, Taiwan region now has more rapid short-term climate change and increased frequency of extreme climate. The number of annual rainfall days is reduced while the probability of torrential rain and extremely heavy rain is largely increased, resulting in increased occurrence frequency of middle to high water level and water flow. The weight of lead fish increases with the increased current velocity and water depth to such an extent that can not be handled simply by manual operation. Sometimes, even a hoist is needed to perform the measuring. Therefore, increased labor cost is required while the measuring efficiency is low.

SUMMARY OF THE INVENTION

A primary object of the present invention is to provide an improved fluid measuring instrument carrier structure to overcome the disadvantages and inconveniences in the conventional ways of measuring water depth and current velocity.

To achieve the above and other objects, the fluid measuring instrument carrier structure provided according to the present invention mainly includes a carrier main body assembled from three axially connected steel pipes and provided from front to back at predetermined positions with a current meter, a front current-guiding holding-down plate, and a rear current-guiding holding-down plate.

The current meter is provided at a front end of the carrier main body.

The front current-guiding holding-down plate includes two sets of horizontal and vertical wing portions, and has a gravity-center adjuster connected thereto.

The rear current-guiding holding-down plate also includes two sets of horizontal and vertical wing portions.

The whole carrier structure is designed based on the principles of fluid mechanics and is cost-effective and practical for use. When the carrier structure is in use, the front and rear current-guiding holding-down plates are affected by water currents to naturally submerge in water and horizontally sway leftward and rightward along with water currents, allowing the carrier main body to keep in a stable and balanced state. A user can effortlessly operate the carrier structure to quickly complete measuring of water depth and current velocity.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
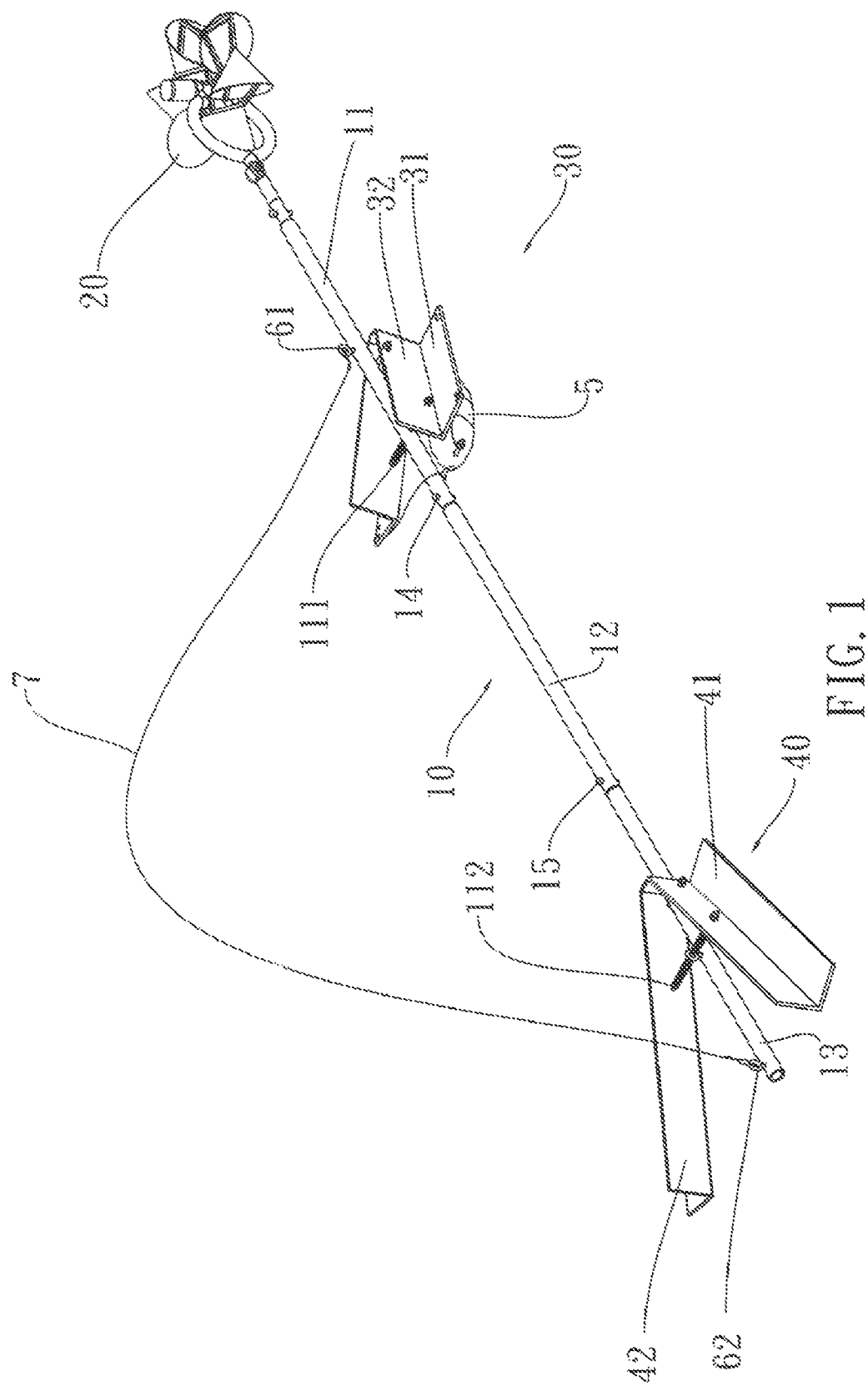
FIG. 1 is an assembled perspective view of a fluid measuring instrument carrier structure according to a preferred embodiment of the present invention.
Figure 2:
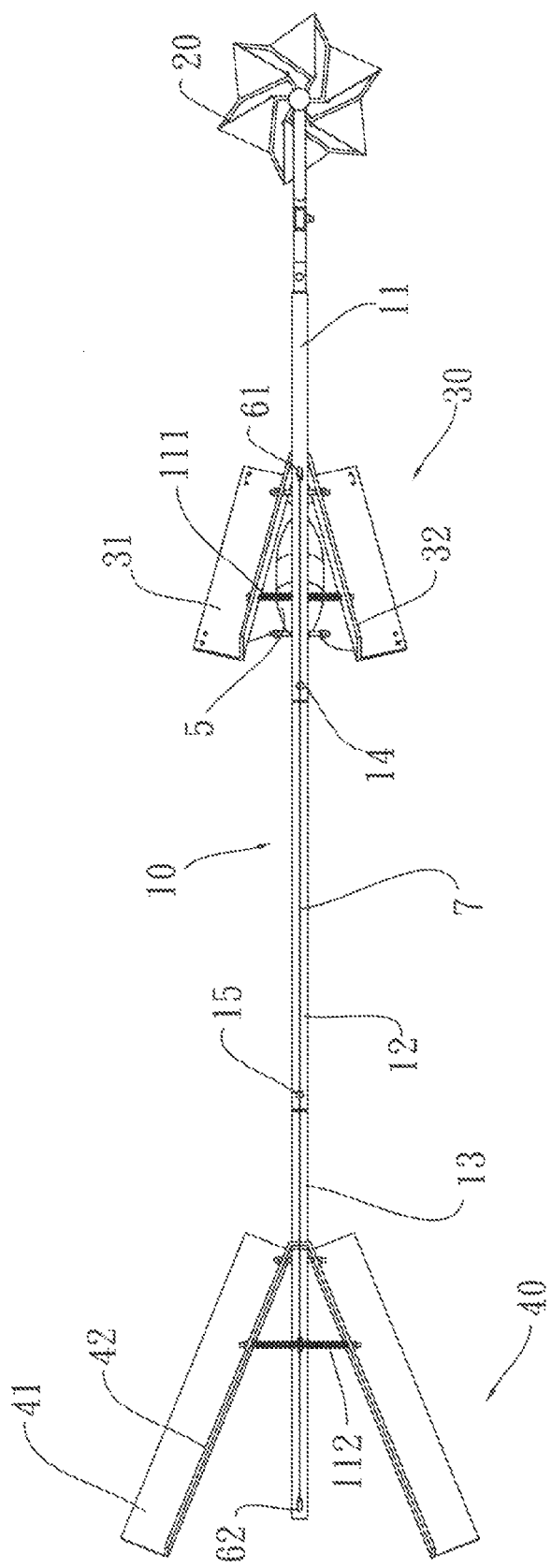
FIG. 2 is a top view of FIG. 1.
Figure 3:
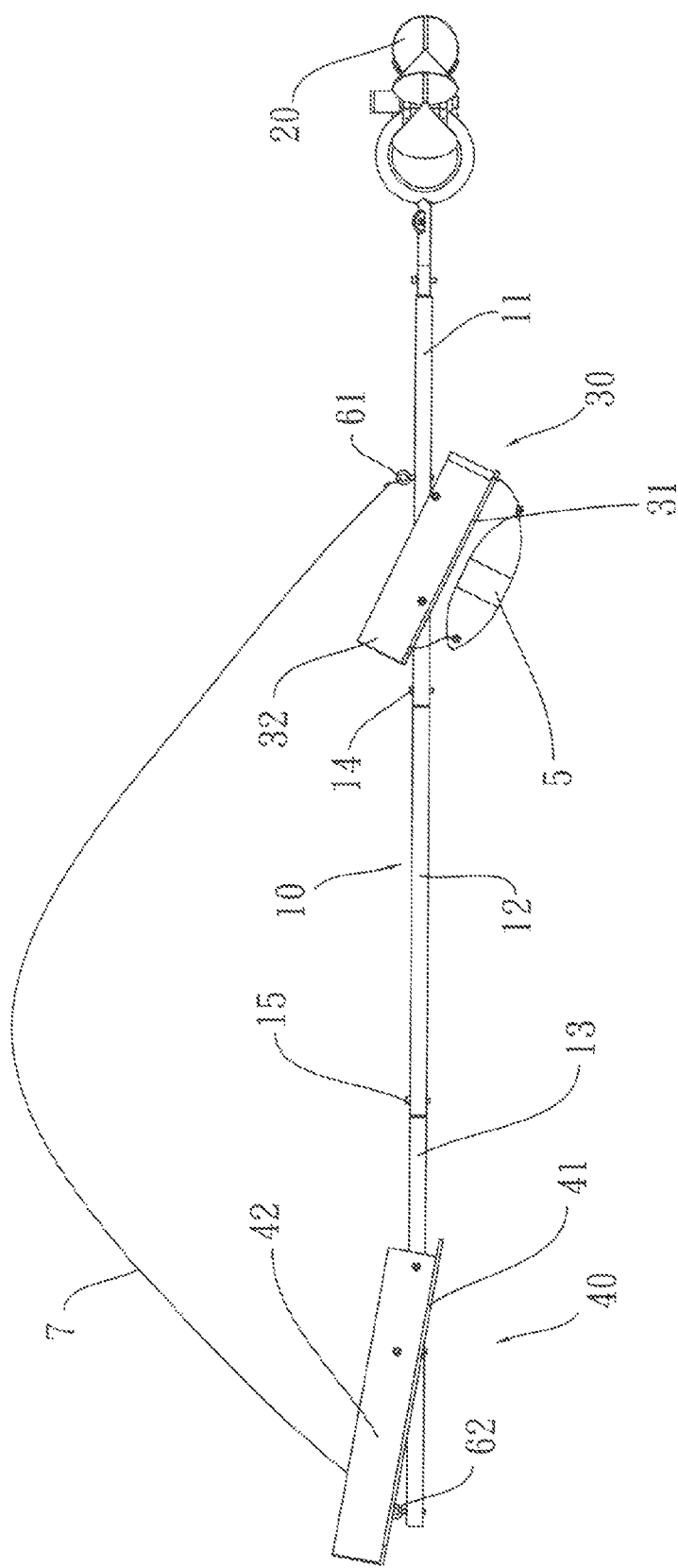
FIG. 3 is a side view of FIG. 1.

Please refer to FIGS. 1, 2 and 3. A fluid measuring instrument carrier structure according to a preferred embodiment of the present invention includes a carrier main body 10 assembled from three pieces of steel pipes, namely, a front, a middle, and a rear steel pipe 11, 12 and 13. The front and middle steel pipes 11, 12 are axially connected together via a connector 14, and the middle and rear steel pipes 12, 13 are axially connected together via a connector 15, allowing the carrier main body 10 to be easily assembled or disassembled. The carrier main body 10 is provided from front to back at predetermined positions with a current meter 20, a front current-guiding holding-down plate 30 and a rear current-guiding holding-down plate 40.

The current meter 20 is located at a front end of the carrier main body 10.

The front current-guiding holding-down plate 30 includes two sets of horizontal wing portion 31 and vertical wing portion 32. A gravity-center adjuster 5 is connected to the front current-guiding holding-down plate 30. The front current-guiding holding-down plate 30 can be formed using an L-shaped aluminum alloy angle having a horizontal section and a vertical section. The horizontal section of the aluminum alloy angle is cut apart at a predetermined position, at where the vertical section of the aluminum alloy angle is bent to thereby form a substantially V-shaped member having two opposite sets of horizontal wing portion 31 and vertical wing portion 32. The vertical wing portions 32 are kept connected at front ends thereof to define a front end for the front current-guiding holding-down plate 30. The two vertical wing portions 32 are correspondingly drilled near respective upper front end to provide a pair of first holes, through which a screw is extended to thereby fixedly keep the front end of the front current-guiding holding-down plate 30 located below a lower front of the front steel pipe 11, so that the front current-guiding holding-down plate 30 can be vertically inclined relative to the carrier main body 10 by a desired angle. Meanwhile, the two sets of horizontal and vertical wing portions 31, 32 located at two opposite sides of the carrier main body 10 are horizontally separated from each other to contain a predetermined angle between them. The front steel pipe 11 is horizontally drilled to provide a horizontal hole near a rear end thereof. A long screw is extended through the horizontal hole with two springs 111 fitted around two ends of the long screw. The two ends of the long screw are then engaged with two second holes correspondingly drilled near lower rear ends the two vertical wing portions 32, so that the front current-guiding holding-down plate 30 is able to slightly horizontally sway leftward and rightward in water currents to keep the carrier main body 10 in a stable and balanced state.

The rear current-guiding holding-down plate 40 also includes two sets of horizontal wing portion 41 and vertical wing portion 42. The rear current-guiding holding-down plate 40 is formed using an L-shaped aluminum alloy angle longer than that for forming the front current-guiding holding-down plate 30. The L-shaped aluminum alloy angle for the rear current-guiding holding-down plate 40 also has a vertical section and a horizontal section. The horizontal section is cut apart at a predetermined position, at where the vertical section of the aluminum alloy angle is bent to thereby form a substantially V-shaped member having two opposite sets of horizontal wing portion 41 and vertical wing portion 42. The vertical wing portions 42 are kept connected at front ends thereof to define a front end for the rear current-guiding holding-down plate 40. The front end of the rear current-guiding holding-down plate 40 is drilled at a center thereof to provide a round hole, through which the rear steel pipe 13 is extended. Meanwhile, the two vertical wing portions 42 and the rear steel pipe 13 are correspondingly horizontally drilled near respective front end to provide three horizontally aligned third holes, through which a screw is extended, so that the vertical wing portions 42 are held at front ends to the rear steel pipe 13. The two sets of horizontal and vertical wing portions 41, 42 located at two opposite sides of the carrier main body 10 are horizontally separated from each other to contain a predetermined angle between them, and the angle is larger than the angle contained between the two sets of horizontal and vertical wing portions 31, 32 of the front current-guiding holding-down plate 30. The rear steel pipe 13 is vertically drilled near a rear end thereof to provide a fourth hole thereon. A ring-headed screw is screwed into the fourth hole to thereby lock to the rear steel pipe 13. A long screw is extended through the ring on the top of the ring-headed screw with two springs 112 fitted around two ends of the long screw. Then, the two ends of the long screw are engaged with holes correspondingly formed on the two vertical wing portions 42, such that the rear current-guiding holding-down plate 40 is vertically inclined relative to the carrier main body 10 by an angle smaller than the inclination angle of the front current-guiding holding-down plate 30. With these arrangements, the rear current-guiding holding-down plate 40 can also slightly horizontally sway leftward and rightward in water currents to keep the carrier main body 10 in a stable and balanced state.

The gravity-center adjuster 5 is formed by drilling two holes on a front and a rear end of a lead fish. Two screws are separately extended through the two holes, and each end of the two screws are provided with a through hole. Four pieces of thin steel wires are separately fixedly connected at respective one end to the through holes on the two screws, and at respective another end to four through holes drilled near outer front and rear corners of the two horizontal wing portions 31 of the front current-guiding holding-down plate 30, such that the gravity-center adjuster 5 is held to a slant position relative to the front current-guiding holding-down plate 30 with the front end of the lead fish located at a level lower than the rear end. Therefore, when the carrier main body 10 drifts in water currents, the four steel wires allow the gravity-center adjuster 5 to constantly adjust a center of gravity of the carrier main body 10 to keep the same in a balanced state.

Further, the front and the rear steel pipe 11, 13 are vertically drilled at predetermined positions to provide two holes, to each of which a ring-headed screw is screwed, so that two hanging rings 61, 62 are provided on the front and the rear steel pipe 11, 13, respectively. A high-tensile suspension rope 7 is movably connected at two ends to the two hanging rings 61, 62, and is then connected to a steel cable. At this point, the fluid measuring instrument carrier structure according to the present invention is completed and can be used at a measuring station on a bridge to perform suspended measuring of water depth and current velocity.

Figure 4:
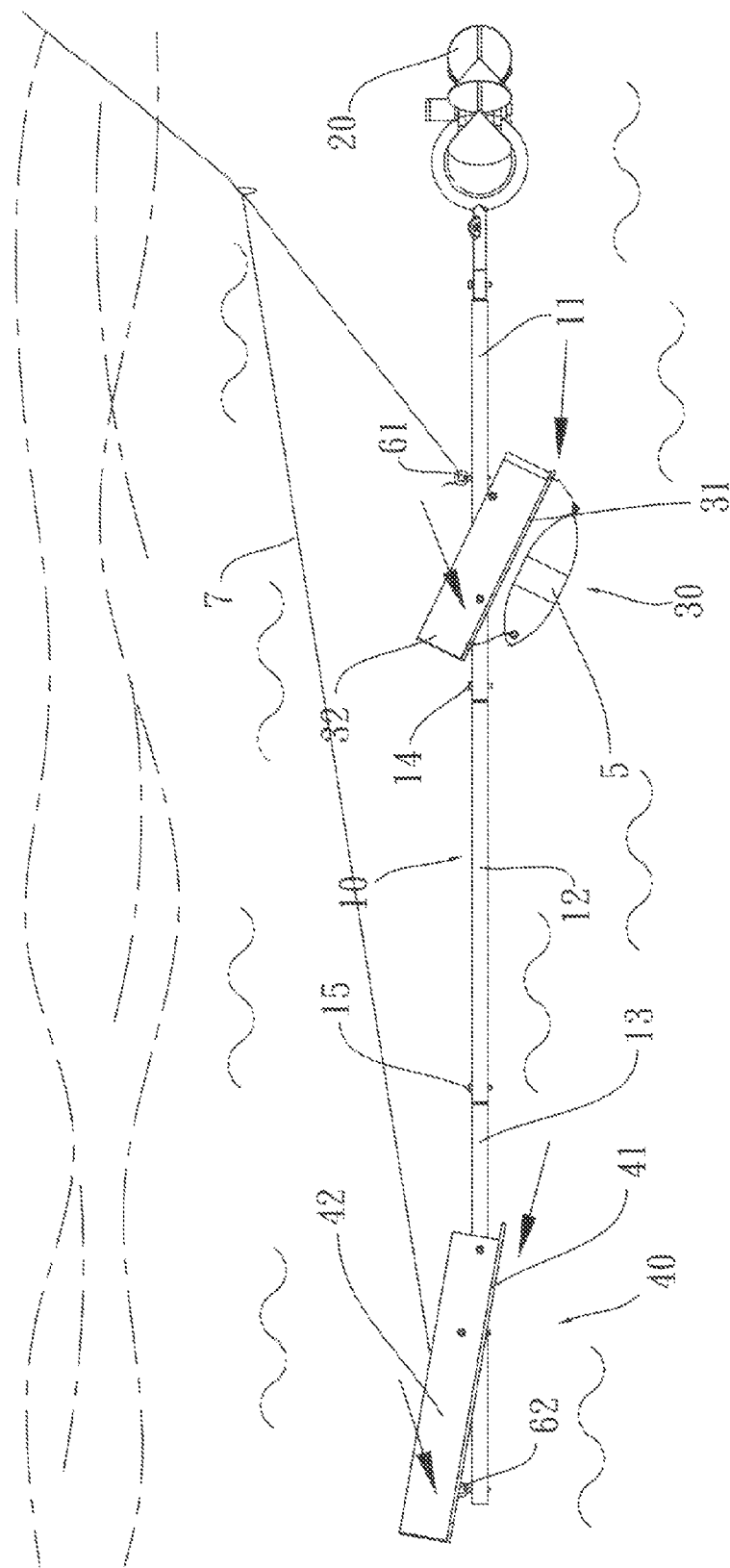
FIG. 4 shows the fluid measuring instrument carrier structure of the present invention in use.

Please refer to FIGS. 1 and 4 at the same time. To perform the suspended measuring, the fluid measuring instrument carrier structure according to the present invention is put in the river at a location downstream of the bridge measuring station. Due to the water currents, the carrier main body 10 is oriented against water. As a principle of fluid mechanics, the front and rear current-guiding holding-down plates 30, 40 are submerged in water due to water currents. When a measurer unwinds the cable, the carrier main body 10 naturally sinks to the river bed. At this point, put a mark on the cable before the carrier main body 10 is pulled up to the water surface, and a water depth is measured. Then, the carrier main body 10 is lowered to different water levels, such as at 0.2, 0.6, and 0.8, to measure the current velocity. Since the carrier main body 10 submerges due to the water current force, the measuring of water depth and current velocity can still be easily achieved with the carrier structure of the present invention even in the flooded rivers during typhoon.

In brief, the fluid measuring instrument carrier structure according to the present invention has the following advantages:

1. According to the principles of fluid mechanics, the front and rear current-guiding holding-down plates are submerged in water due to water currents. Therefore, the water depth and the current velocity can be easily and quickly measured.
2. With the structural design of the carrier structure according to the present invention, the current meter connected to the carrier structure can be easily and quickly replaced with other desirable types. For example, when the current velocity is smaller than 3M/sec., a cup-type current meter can be carried for use; and when the current velocity is larger than 3-6M/sec., a propeller-type high-speed current meter can be carried for use. Further, a tripod digital current meter can also be used.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A fluid measuring instrument carrier structure, comprising:
   a carrier main body being assembled from a front, a middle and a rear steel pipe, and being provided from front to back at predetermined positions with a current meter, a front current-guiding holding-down plate, and a rear current-guiding holding-down plate;
   the current meter being provided at a front end of the carrier main body;
   the front current-guiding holding-down plate including two sets of horizontal and vertical wing portions, and having a gravity-center adjuster connected thereto; and the rear current-guiding holding-down plate including two sets of horizontal and vertical wing portions;

whereby, according to the principles of fluid mechanics, the front and the rear current-guiding holding-down plate naturally submerge in water due to water currents, and are able to slightly horizontally sway leftward and rightward in water currents to keep the carrier main body in a stable and balanced state, enabling a user to easily and quickly complete measuring of water depth and current velocity.

2. The fluid measuring instrument carrier structure as claimed in claim 1, wherein the front current-guiding holding-down plate is formed of an L-shaped metal angle having a horizontal and a vertical section; the horizontal section being cutting apart at a predetermined position, at where the vertical section being bent to thereby form the two sets of horizontal and vertical wing portions of the front current-guiding holding-down plate; the vertical wing portions being kept connected at respective front end to provide a front end of the front current-guiding holding-down plate and being horizontally separated from each other by a predetermined angle; the two vertical wing portions being correspondingly drilled near respective upper front end to provide two holes, through which a screw is extended to keep the front end of the front current-guiding holding-down plate located below a lower front portion of the front steel pipe of the carrier main body; the front steel pipe being horizontally drilled near a rear end thereof to provide a hole, through which a long screw is extended; two springs being put therearound two ends of the long screw, and the two ends of the long screw being engaged with two holes correspondingly provided on the two vertical wing portions near a lower rear end thereof.

3. The fluid measuring instrument carrier structure as claimed in claim 2, wherein the rear current-guiding holding-down plate is formed of an L-shaped metal angle longer than that for forming the front current-guiding holding-down plate, the L-shaped metal angle having a horizontal and a vertical section, the horizontal section being cutting apart at a predetermined position, at where the vertical section being bent to thereby form the two sets of horizontal and vertical wing portions of the rear current-guiding holding-down plate; the vertical wing portions being kept connected at respective front end to provide a front end of the rear current-guiding holding-down plate and being horizontally separated from each other by a predetermined angle larger than that formed on the front current-guiding holding-down plate; the front end of the rear current-guiding holding-down plate being drilled to provide a central round hole, through which the rear steel pipe of the carrier main body is extended; the two vertical wing portions and the rear steel pipe being correspondingly horizontally drilled near respective front end to provide three horizontally aligned third holes, through which a screw being extended, so that the vertical wing portions are held at front ends to the rear steel pipe; the rear steel pipe being vertically drilled near a rear end thereof to provide a hole for a ring-headed screw to screw thereinto, a long screw being extended through the ring on the top of the ring-headed screw with two springs fitted around two ends of the long screw, and the two ends of the long screw being engaged with holes correspondingly formed on the two vertical wing portions, such that the rear current-guiding holding-down plate is vertically inclined relative to the carrier main body by an angle smaller than an inclination angle of the front current-guiding holding-down plate relative to the carrier main body.

4. The fluid measuring instrument carrier structure as claimed in claim 1, wherein the gravity-center adjuster is formed by drilling two holes on a front and a rear end of a lead fish, two screws being separately extended through the two holes, and each end of the two screws being provided with a through hole for an end of a thin steel wire to fixedly connected thereto; four through holes being drilled near outer front and rear corners of the two horizontal wing portions of the front current-guiding holding-down plate for another ends of the steel wires to connect thereto, so that the gravity-center adjuster is held by the steel wires to a slant position relative to the front current-guiding holding-down plate with the front end of the lead fish located at a level lower than the rear end; whereby when the carrier main body drifts in water currents, the four steel wires allow the gravity-center adjuster to constantly adjust a center of gravity of the carrier main body to keep the same in a balanced state.

5. The fluid measuring instrument carrier structure as claimed in claim 2, wherein the front, middle and rear steel pipes forming the carrier main body are axially detachably connected to one another via connectors.

6. The fluid measuring instrument carrier structure as claimed in claim 3, wherein the front, middle and rear steel pipes forming the carrier main body are axially detachably connected to one another via connectors.

7. The fluid measuring instrument carrier structure as claimed in claim 4, wherein the front, middle and rear steel pipes forming the carrier main body are axially detachably connected to one another via connectors.

8. The fluid measuring instrument carrier structure as claimed in claim 5, wherein the front and the rear steel pipe of the carrier main body are respectively vertically drilled at a predetermined position with a hole for two ring-headed screws to screw thereinto to provide two hanging rings, and a high-tensile suspension rope being movably connected at two ends to the two hanging rings.

9. The fluid measuring instrument carrier structure as claimed in claim 6, wherein the front and the rear steel pipe of the carrier main body are respectively vertically drilled at a predetermined position with a hole for two ring-headed screws to screw thereinto to provide two hanging rings, and a high-tensile suspension rope being movably connected at two ends to the two hanging rings.

10. The fluid measuring instrument carrier structure as claimed in claim 7, wherein the front and the rear steel pipe of the carrier main body are respectively vertically drilled at a predetermined position with a hole for two ring-headed screws to screw thereinto to provide two hanging rings, and a high-tensile suspension rope being movably connected at two ends to the two hanging rings.

\* \* \* \* \*